(12) United States Patent
Grandine et al.

(10) Patent No.: US 7,333,109 B2
(45) Date of Patent: Feb. 19, 2008

(54) SYSTEM, METHOD AND COMPUTER PROGRAM PRODUCT FOR MODELING AT LEAST ONE SECTION OF A CURVE

(75) Inventors: Thomas A. Grandine, Issaquah, WA (US); Thomas A. Hogan, Seattle, WA (US)

(73) Assignee: The Boeing Company, Chicago, IL (US)

( * ) Notice: Subject to any disclaimer, the term of this patent is extended or adjusted under 35 U.S.C. 154(b) by 254 days.

(21) Appl. No.: 10/309,969

(22) Filed: Dec. 4, 2002

(65) Prior Publication Data

US 2004/0109001 A1    Jun. 10, 2004

(51) Int. Cl.
*G06T 11/20* (2006.01)
*G06F 19/00* (2006.01)

(52) U.S. Cl. .................. 345/442; 700/187; 345/443
(58) Field of Classification Search ........ 345/441–443; 700/187
See application file for complete search history.

(56) References Cited

U.S. PATENT DOCUMENTS 5,029,096 A * 7/1991 Itaba ..................... 700/187
2002/0065587 A1   5/2002 Syrjarinne et al.

OTHER PUBLICATIONS

Jorg Peters, "Local Generalized Hermite Interpolation by Quartic C2 Space Curves", ACM Trans. on Graphics, vol. 8, Issue 3, Jul. 1989, p. 235-242.*

Carl de Boor, et al., "High Accuracy Geometric Hermite Interpolation", Computer Aided Geometric Design, 4(1987), p. 269-278.*
Barry Joe, "Quartic Beta-Splines", ACM Trans. on Graphics, vol. 9, No. 3, Jul. 1990, pp. 301-337.*
W.L.F. Degen; High Accuracy Approximation of Parametric Curves; *Mathematical Methods for Curves and Surfaces*; 1995; pp. 83-98; ISBN 8265-1268-2; Vanderbilt University Press.
Carl De Boor, Klaus Höllig, Malcolm Sabin; High Accuracy Geometric Hermite Interpolation;*Computer Aided Geometric Design 4*; 1987; pp. 269-278; North Holland.
Robert Schaback; Optimal Geometric Hermite Interpolation of Curves; *Mathemataical Methods for Curves and Surfaces II*; 1998; pp. 1-12; Vanderbilt University Press, Nashville, TN.
Robert Schaback; Rational Geometric Curve Interplation; *Mathematical Methods in CAGD and Image Processing*; pp. 1-20; ISBN 0-12-000000-X; Academic Press; Boston, MA.
Robert Schaback; Interpolation with Piecewise Quadratic Visually $C^2$ Bézier Polynominals; *Comput Aided Geom Design 6*; 1989; pp. 219-233.

(Continued)

*Primary Examiner*—Jin-Cheng Wang
(74) *Attorney, Agent, or Firm*—Alston & Bird LLP

(57) ABSTRACT

A system, method and computer program product are provided for modeling at least one section of a curve. Each section can be modeled by initially providing a pair of positions ($f_i$, $f_{i+1}$) of the section of the curve including associated directions ($d_i$, $d_{i+1}$) and curvatures ($\kappa_i$, $\kappa_{i+1}$). Then, points $b_0$, $b_1$, $b_2$, $b_3$ and $b_4$ can be identified based upon the pair of positions ($f_i$, $f_{i+1}$) and associated directions ($d_i$, $d_{i+1}$) and curvatures ($\kappa_i$, $\kappa_{i+1}$). Thereafter, a quartic interpolant p(t) can be determined over an interval (i≦t≦i+1) based upon points $b_0$, $b_1$, $b_2$, $b_3$ and $b_4$ to thereby model the section of the curve. The quartic interpolant can be determined such that the interpolant p(t) has a position, direction and curvature equal to $f_i$, $d_i$ and $\kappa_i$, respectively, at t=i, and the interpolant p(t) has a position, direction and curvature equal to $f_{i+1}$, $d_{i+1}$, and $\kappa_{i+1}$, respectively, at t=i+1.

30 Claims, 5 Drawing Sheets

OTHER PUBLICATIONS

W.L.F. Degen; High Accurate Rational Approximation of Parametric Curves; pp. 1-18; available in *Computer Aided Geometric Design 10*; 1993; Elsevier Science Publishers B.V.

Algebraic Geometry for CAGD (Chapter 8); available at <http://students.cs.byu.edu/~tom/557/text/ag.pdf> (visited Dec. 4, 2002).

* cited by examiner

SYSTEM, METHOD AND COMPUTER PROGRAM PRODUCT FOR MODELING AT LEAST ONE SECTION OF A CURVE

FIELD OF THE INVENTION

The present invention relates generally to systems, methods and computer program products for modeling curves and, more particularly, relates to systems, methods and computer program products for modeling at least one section of a curve according to a quartic Hermite interpolation technique.

BACKGROUND OF THE INVENTION

In a number of different disciplines, such as computer-aided geometric design (CAGD), it is necessary to model, or approximate, parametric curves from sparse data. Typically, such modeling techniques attempt to model planar curves with high accuracy, while maintaining curvature continuity. In this regard, many conventional techniques model curves based upon interpolation algorithms that are based upon the notion of the curve being twice continuously differentiable with respect to arclength and capable of being constructed locally.

A planar curve f is said to be twice continuously differentiable if the unit tangent vector $f^*:=f'/|f'|$ and the signed curvature $f^{**}:=f'\times f''/|f'|^3$ are continuous. Let $f_i$, $d_i$ and $\kappa_i$ be prescribed positions, directions and curvature values, respectively. For example, these data might be thought to have come from a twice continuously differentiable planar curve as:

$$f_i:=f(t_i),\ d_i:=f^*(t_i)\ \text{and}\ \kappa_i:=f^{**}(t_i) \tag{1}$$

From such data, then, one such interpolation technique, known as Hermite interpolation, can determine a geometric Hermite interpolant p that satisfies:

$$p(i)=f_i,\ p^*(i)=d_i\ \text{and}\ p^{**}(i)=\kappa_i \tag{2}$$

where the components of p are polynomials on each parameter interval [i, i+1]. Also, to preserve the convexity of the data, that is, to satisfy the following assumption:

$$\text{sign}(\kappa_i)=\text{sign}(d_i\times(f_{i+1}-f_i))=\text{sign}(f_i-f_{i-1})\times d_i),\ \text{for all}\ i \tag{3}$$

the curvature of the interpolant typically has the same sign throughout.

As will be appreciated by those skilled in the art, many modeling, or interpolation techniques, operate to model a curve by separately interpolating different sections of the curve, where each section is defined by a set of end points. In this regard, because p can be constructed interval-by-interval, any such piecewise constructed interpolant will necessarily be continuously differentiable. Therefore, the interpolant p can be described as being constructed over the interval [0,1] without any loss of generality. According to one Hermite interpolation technique, developed by de Boor, Höllig and Sabin (referred to herein as the BHS technique), a cubic polynomial is used on each interval. Turning attention to the interval [0,1], then, the interpolant p can be written as:

$$p(t)=\sum_{j=0}^{3}b_j B_j(t),\ (0\leq t\leq 1)$$

with $B_j(t):=\binom{3}{j}t^j(1-t)^{(3-j)}$.

Interpolation of position at the given knots implies that $$b_0=f_0\ \text{and}\ b_3=f_1.$$

The remaining interpolation conditions can be simplified by introducing $$\tilde{b}:=\frac{(f_1\times d_1)d_0+(d_0\times f_0)d_1}{d_0\times d_1}$$

Geometrically, $\tilde{b}$ is the intersection of the line through $f_0$ parallel to $d_0$, and the line through $f_1$ parallel to $d_1$, as shown in FIG. 1. The tangent interpolation condition is then defined as:

$$b_1=(1-\rho_0)b_0+\rho_0\tilde{b}\ \text{and}\ b_2=(1-\rho_1)b_3+\rho_1\tilde{b}$$

for some $0<\rho_0,\rho_1\leq 1$, where $\rho_0$ and $\rho_1$ represent weights in writing $b_1$ and $b_2$ as convex combinations of $b_0$, $b_3$ and $\tilde{b}$. Moreover, the curvature interpolation condition is given by:

$$\kappa_0=\frac{2d_0\times(b_2-b_1)}{3|b_1-b_0|^2}\ \text{and}\ \kappa_1=\frac{2(b_2-b_1)\times d_1}{3|b_3-b_2|^2}.$$

Substituting $b_2-b_1=b_2-\tilde{b}+\tilde{b}-b_1=(1-\rho_1)(b_3-\tilde{b})+(1-\rho_0)(\tilde{b}-b_0)$ into the last equations for the curvature interpolation condition, $\kappa_0$ and $\kappa_1$ can be determined as follows:

$$\kappa_0=\frac{2(1-\rho_1)d_0\times(b_3-\tilde{b})}{3\rho_0^2|\tilde{b}-b_0|^2}\ \text{and}\ \kappa_1=\frac{2(1-\rho_0)(\tilde{b}-b_0)\times d_1}{3\rho_1^2|b_3-\tilde{b}|^2} \tag{4}$$

Defining an $R_0$ and $R_1$ as follows:

$$R_0:=\frac{3\kappa_0|\tilde{b}-b_0|^2}{2d_0\times(b_3-\tilde{b})}\ \text{and}\ R_1:=\frac{3\kappa_1|b_3-\tilde{b}|^2}{2(\tilde{b}-b_0)\times d_1}$$

and solving equation (4) for $\rho_0$ and $\rho_1$ gives:

$$\rho_0=1-R_1\rho_1^2\ \text{and}\ \rho_1=1-R_0\rho_0^2.$$

As will be appreciated by those skilled in the art, the BHS technique may have 0, 1, 2 or 3 solutions with $0<\rho_0,\rho_1\leq 1$ and a sufficient condition for solvability is that $(1-R_0)(1-R_1)\geq 0$. With respect to techniques such as the BHS technique, it has been suggested that $f_i$ and $d_i$ be prescribed first, with appropriate values for $\kappa_i$ selected to satisfy the foregoing condition. However, such a technique of determining $f_i$, $d_i$ and $\kappa_i$ is not always feasible since, for example, there may be predetermined values that $\kappa_i$ must have. Also, such a condition, which in terms of the data can be represented as:

$$(2(d_0\times(f_1-f_0))(d_0\times d_1)^2-3\kappa_0((f_1-f_0)\times d_1)^2)\cdot(2((f_1-f_0)\times d_1)(d_0\times d_1)^2-3\kappa_1(d_0\times(f_1-f_0))^2)\geq 0,$$

puts an abstruse restriction on the data. Further, $\rho_0$ and $\rho_1$ cannot be chosen in any manner that will make them continuous functions of the data for all admissible data sets. For example, as shown in FIG. 2, when the data changes in such a way that $R_1$ remains constant at 0.875 while $R_0$ increases to 0.875 (say from 0), then $\rho_0$=0.1674 and $\rho_1$=0.9755 when $R_0$=$R_1$=0.875. However, if the same data configuration is arrived at in such a way that $R_0$ remains constant at 0.875 while $R_1$ increases to 0.875 (say from 0), then $\rho_0$=0.9755 and $\rho_1$=0.1674 when $R_0$=$R_1$=0.875.

SUMMARY OF THE INVENTION

In light of the foregoing background, the present invention provides an improved system, method and computer program product for modeling at least one section of a curve. The system, method and computer program product of embodiments of the present invention are capable of modeling each section of a curve f based upon data including a pair of positions ($f_i$, $f_{i+1}$) of the section of the curve, wherein the pair of positions includes associated directions ($d_i$, $d_{i+1}$) and associated curvatures ($\kappa_i$, $\kappa_{i+1}$). Advantageously, embodiments of the present invention are capable of modeling each section to exactly match the positions, directions and curvatures of data provided for the respective section. The system, method and computer program product of embodiments of the present invention are also capable of modeling each section of the curve to thereby preserve the shape properties of the curve f, such as by maintaining the convexity in the modeled section.

As indicated above, the system, method and computer program product of embodiments of the present invention are capable of modeling each section of a curve. Advantageously, then, changes in the data only affect the curve locally. That is to say, altering one data position (e.g., $f_1$) only alters the modeled curve up to adjacent data point(s) (e.g., $f_{i+1}$). As such, a point in one section can be altered without affecting the modeled curve in subsequent sections. In addition, the system, method and computer program product of embodiments of the present invention are capable of modeling the curve such that a change in the model is directly proportional to a change in the data. In other terms, the model depends continuously on the data such that small changes in the data (position, direction and/or curvature) will produce only small changes in the resulting model.

The system, method and computer program product of embodiments of the present invention are further capable of modeling each section of the curve with sixth-order accuracy. As will be appreciated, due to the finite number of data points that may be provided, no modeled section of the curve can exactly reproduce the respective section of the curve f. In this regard, the accuracy of a model can be defined based upon how much closer the modeled section comes to the respective section of the curve as the number of provided positions from the curve f increase. As such, by modeling each section of the curve with sixth-order accuracy, as the number of provided positions from a section of the curve increase by a factor of g, the modeled section of the curve will move $g^6$ closer to the section of the curve.

According to one aspect of the present invention, a method is provided for modeling at least one section of a curve. According to one embodiment, a section is modeled by initially providing a pair of positions ($f_i$, $f_{i+1}$) of the section of the curve, where the pair of positions includes associated directions ($d_i$, $d_{i+1}$) and associated curvatures ($\kappa_i$, $\kappa_{i+1}$). Then, points $b_0$, $b_1$, $b_2$, $b_3$ and $b_4$ are identified based upon the pair of positions ($f_i$, $f_{i+1}$) and associated directions ($d_i$, $d_{i+1}$) and curvatures ($\kappa_i$, $\kappa_{i+1}$). More particularly, points $b_0$, $b_1$, $b_2$, $b_3$ and $b_4$ can be identified by initially defining a control point $\tilde{b}$ based upon the pair of positions ($f_i$, $f_{i+1}$) and the associated directions ($d_i$, $d_{i+1}$). The control point can be defined as a point at the intersection of a line through point $f_0$ parallel to direction $d_0$, and a line through point $f_1$ and parallel to direction $d_1$. In other terms, the control point can be defined according to the following:

$$\tilde{b} := \frac{(f_1 \times d_1)d_0 + (d_0 \times f_0)d_1}{d_0 \times d_1}.$$

After defining the control point $\tilde{b}$, points $b_1$ and $b_3$ can be identified. In this regard, point $b_1$ can be identified on a segment $\overline{b_0 \tilde{b}}$ and point $b_3$ can be identified on a segment $\overline{b_4 \tilde{b}}$, where $b_0$ equals $f_i$ and $b_4$ equals $f_{i+1}$. For example, points $b_1$ and $b_3$ can be identified by defining weights ($\rho_0$, $\rho_1$) such that $0 < \rho_0$, $\rho_1 \leq 1$. Thereafter, points $b_1$ and $b_3$ can be identified according to the following:

$$b_1 = (1-\rho_0)b_0 + \rho_0 \tilde{b} \text{ and } b_3 = (1-\rho_1)b_4 + \rho_1 \tilde{b}.$$

Also after defining the control point $\tilde{b}$, point $b_2$ can be identified such that $b_2$ is disposed within a region bounded by a triangular shape defined by points $\tilde{b}$, $b_1$ and $b_2$, where point $b_2$ is identified based upon the curvatures ($\kappa_i$, $\kappa_{i+1}$). Advantageously, by so identifying point $b_2$, the convexity of the modeled section can be preserved. For example, point $b_2$ can be identified by defining weights ($\alpha_0$, $\alpha_1$) based upon the curvatures ($\kappa_i$, $\kappa_{i+1}$), where the weights ($\alpha_0$, $\alpha_1$) are defined such that $\alpha_0$, $\alpha_1 \geq 0$ and $\alpha_0 + \alpha_1 \leq 1$. Thereafter, point $b_2$ can be identified according to the following:

$$b_2 = \alpha_0 b_1 + \alpha_1 b_3 + (1 - \alpha_0 - \alpha_1)\tilde{b}.$$

In one embodiment, weights ($\alpha_0$, $\alpha_1$) can be defined by defining weights ($\rho_0$, $\rho_1$) and thereafter defining weights ($\alpha_0$, $\alpha_1$) according to the following:

$$\alpha_0 = \frac{R_1 \rho_1^2}{1 - \rho_0} \text{ and } \alpha_1 = \frac{R_0 \rho_0^2}{1 - \rho_1},$$

where $$R_0 := \frac{4\kappa_i |\tilde{b} - b_0|^2}{3 d_i \times (b_4 - \tilde{b})} \text{ and } R_1 := \frac{4\kappa_{i+1} |b_4 - \tilde{b}|^2}{3(\tilde{b} - b_0) \times d_{i+1}}.$$

After identifying points $b_0$, $b_1$, $b_2$, $b_3$ and $b_4$, a quartic interpolant p(t) is determined over an interval ($i \leq t \leq i+1$) based upon points $b_0$, $b_1$, $b_2$, $b_3$ and $b_4$ to thereby model the section of the curve. More particularly, the interpolant p(t) can be determined according to the following:

$$p(t) = \sum_{j=0}^{4} b_j B_j(t),$$

where $$B_j(t) := \binom{4}{j} t^j (1-t)^{(4-j)}.$$

Advantageously, and illustrating that embodiments of the present invention are capable of modeling each section to exactly match the positions, directions and curvatures for the respective section, the interpolant p(t) has a position, direction and curvature equal to $f_i$, $d_i$ and $\kappa_i$, respectively, at t=i, and the interpolant p(t) has a position, direction and curvature equal to $f_{i+1}$, $d_{i+1}$ and $\kappa_{i+1}$, respectively, at t=i+1.

According to other aspects of the present invention, a system and computer program product are provided for modeling at least one section of a curve f.

BRIEF DESCRIPTION OF THE DRAWINGS

Figure 1:
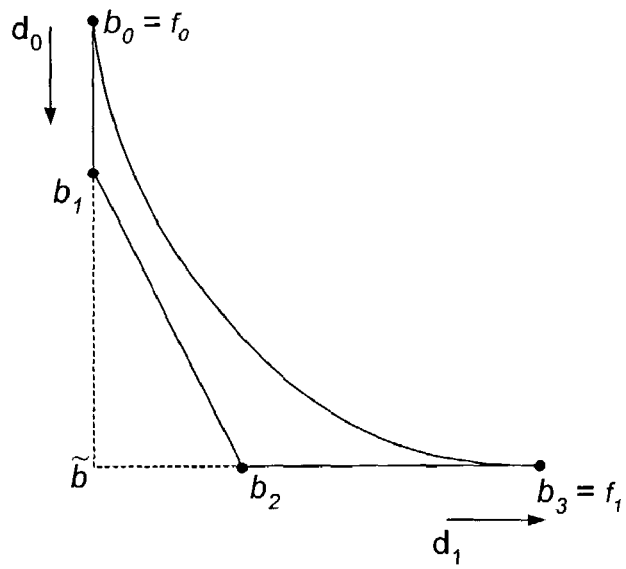
Figure 2:
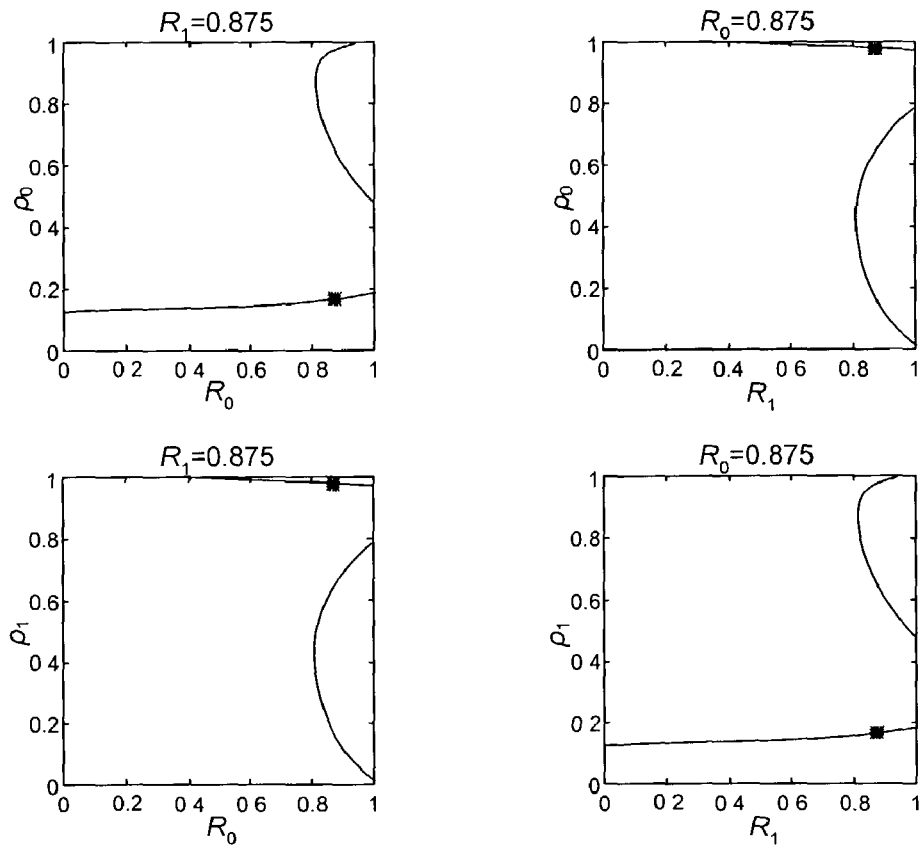
Figure 3:
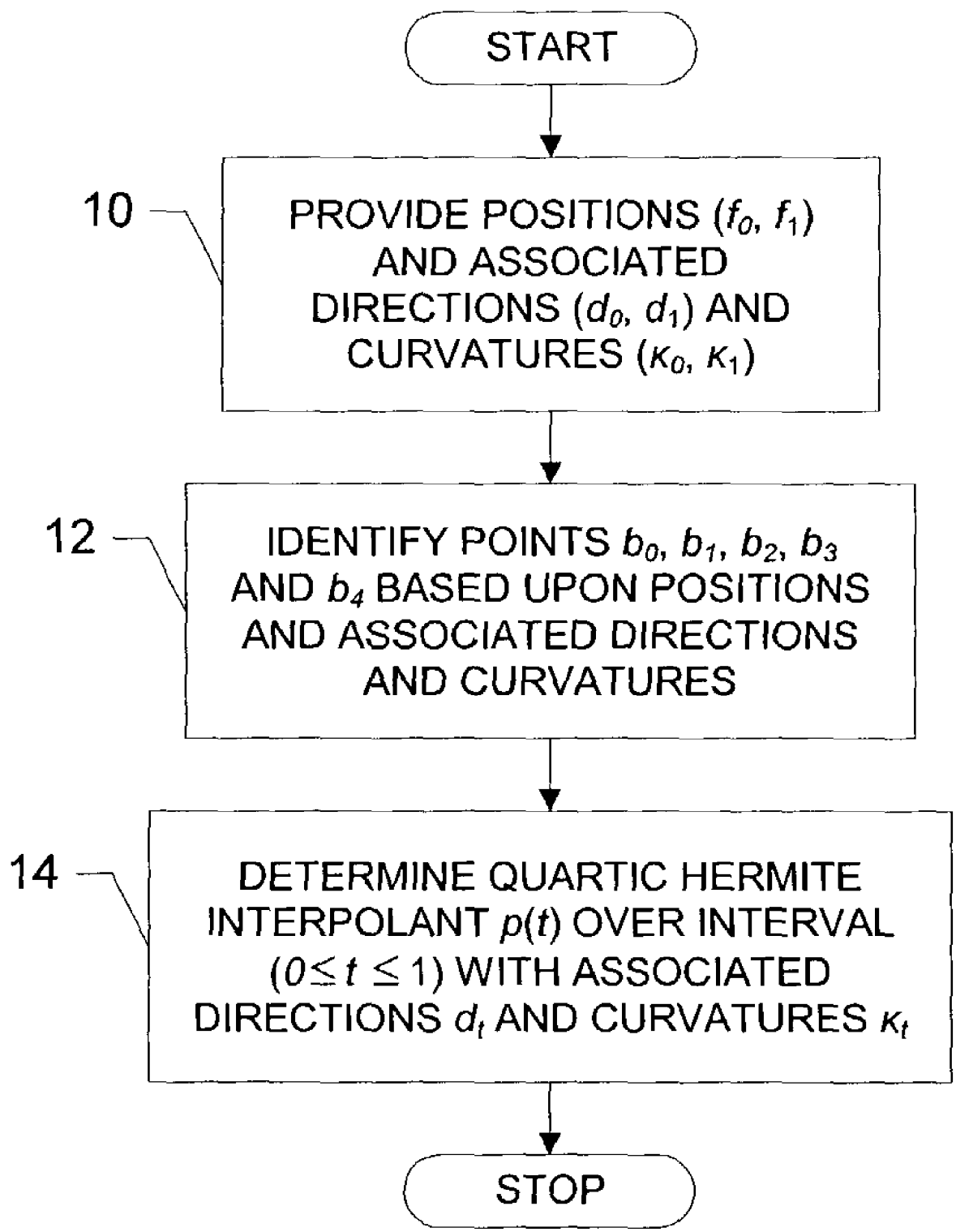
Figure 4:
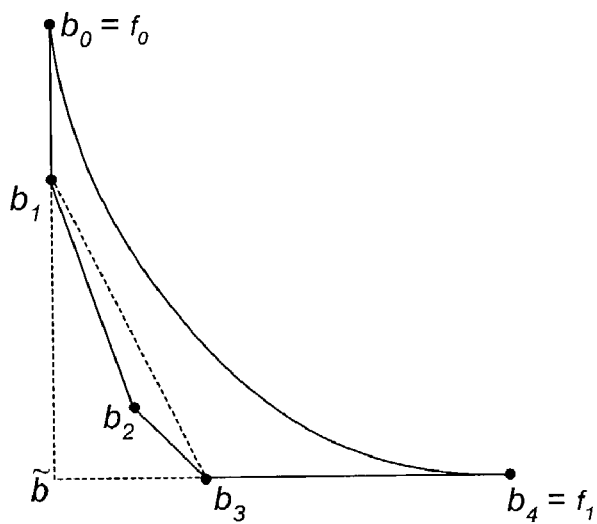
Figure 5:
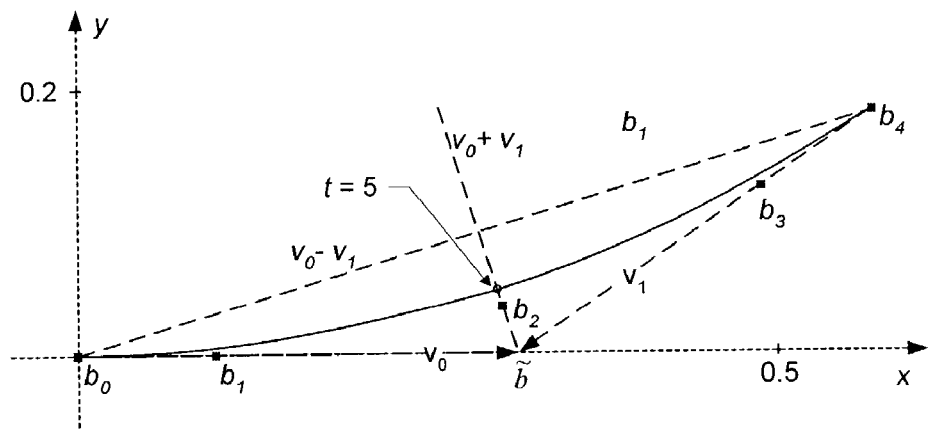
Figure 6:
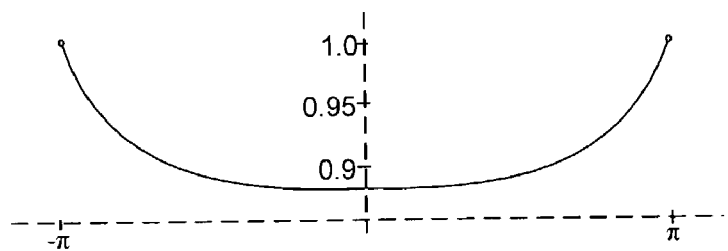
Figure 7A:
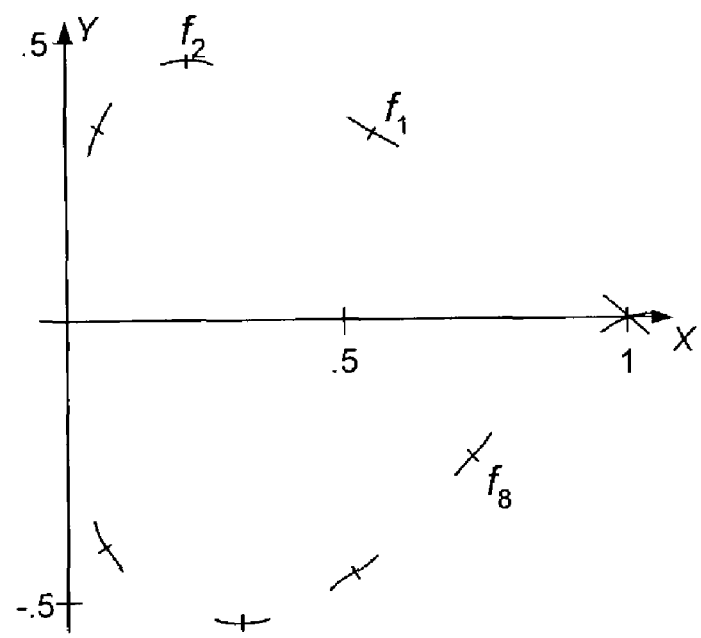
Figure 7B:
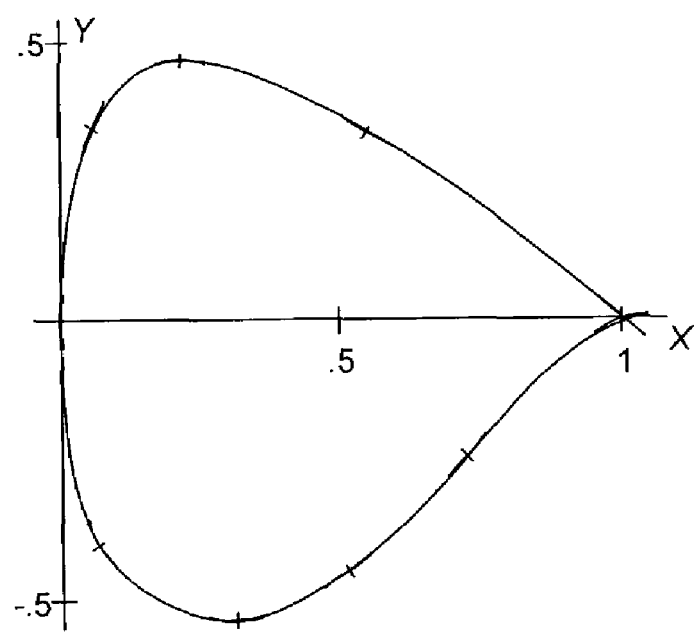
Figure 8:
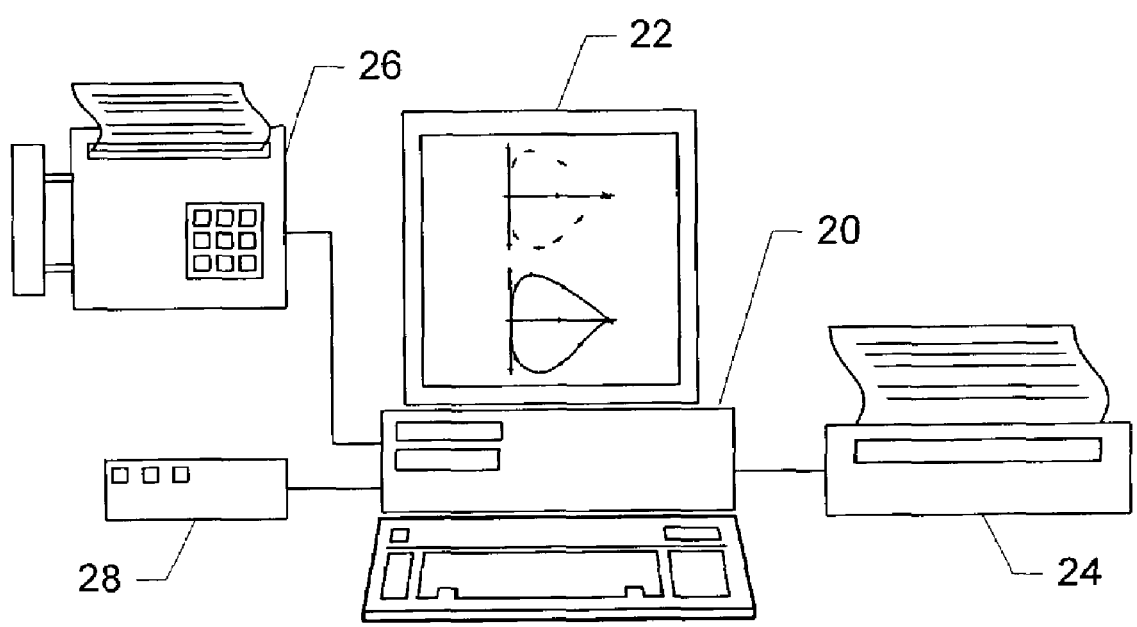

Having thus described the invention in general terms, reference will now be made to the accompanying drawings, which are not necessarily drawn to scale, and wherein:

FIG. 1 illustrates a Bezier polygon with a corresponding cubic curve segment;

FIG. 2 illustrates a situation in which, $\rho_0$ and $\rho_1$ cannot be chosen to be continuous functions of data of planar curve f for all admissible data sets, according to one conventional interpolation technique;

FIG. 3 is a flow chart illustrating various steps in a method of modeling each of at least one section of a curve according to one embodiment of the present invention;

FIG. 4 illustrates a Bezier polygon with a corresponding quartic curve segment according to one embodiment of the present invention;

FIG. 5 illustrates the geometry of data from a circular arc according to one embodiment of the present invention;

FIG. 6 illustrates a plot of $\rho_{opt}(\theta)/\rho_{cnt}(\theta)$ for $-\pi<\theta<\pi$;

FIG. 7A illustrates a set of positions including associated directions and curvatures according to one embodiment of the present invention in the context of designing a dimensionless airfoil;

FIG. 7B illustrates a curve modeled based upon the set of positions from FIG. 7A according to one embodiment of the present invention; and FIG. 8 is a schematic block diagram of the system of one embodiment of the present invention embodied by a computer.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As indicated above in the background section, a planar curve f is said to be twice continuously differentiable if the unit tangent vector $f^*:=f'/|f'|$ and the signed curvature $f^{**}:=f'\times f''/|f'|^3$ are continuous. Again, let $f_i$, $d_i$ and $\kappa_i$ be prescribed positions, directions and curvature values, respectively. For example, these data might be thought to have come from a twice continuously differentiable planar curve as:

$$f_i := f(t_i), \; d_i := f^*(t_i) \text{ and } \kappa_i := f^{**}(t_i) \qquad (1)$$

According to one embodiment of the present invention, then, a system, method and computer program product are provided for modeling at least one section of a curve, where each section is modeled by determining a quartic Hermite interpolant p that satisfies:

$$p(i)=f_i, \; p^*(i)=d_i \text{ and } p^{**}(i)=\kappa_i \qquad (2)$$

where the components of p are polynomials on each parameter interval [i, i+1]. Also as above, the interpolant advantageously preserves the convexity of the data, that is, under the assumption:

$$\text{sign}(\kappa_i)=\text{sign}(d_i\times(f_{i+1}-f_i))=\text{sign}(f_i-f_{i-1})\times d_i), \text{ for all } i \qquad (3)$$

the curvature of the interpolant must have the same sign throughout.

According to one embodiment of the present invention, p is constructed on an interval-by-interval basis. Also, it should be noted that by constructing p on an interval-by-interval basis, the resulting interpolant p is necessarily twice continuously differentiable. The following will describe constructing the interpolant for the interval [0,1], but it should be understood that the interpolant can similarly be constructed for any of a number of other intervals without departing from the spirit and scope of the present invention. Turning attention to the interval [0,1], then, p can be written in its Bezier form as:

$$p(t) = \sum_{j=0}^{4} b_j B_j(t), \quad (0 \leq t \leq 1)$$

where $B_j(t)$ is defined as $$B_j(t) := \binom{4}{j} t^j (1-t)^{(4-j)}.$$

As shown in FIG. 3, then, a method of modeling each of at least one section of a curve begins by providing positions ($f_0$, $f_1$) and associated directions ($d_0$, $d_1$) and curvatures ($\kappa_0$, $\kappa_1$), as shown in block 10. Then, points $b_0$, $b_1$, $b_2$, $b_3$ and $b_4$ can be identified, as shown in block 12. In this regard, points $b_0$, $b_1$, $b_2$, $b_3$ and $b_4$ can be identified based upon the provided positions ($f_0$, $f_1$) and associated directions ($d_0$, $d_1$) and curvatures ($\kappa_0$, $\kappa_1$). After points $b_0$, $b_1$, $b_2$, $b_3$ and $b_4$ have been identified, then, the quartic interpolant p(t) can be determined over an interval ($0 \leq t \leq 1$) based upon points $b_0$, $b_1$, $b_2$, $b_3$ and $b_4$ to thereby model the section of the curve, as illustrated in block 14. As will be appreciated, the interpolant p(t) has a direction and curvature equal to $d_i$ and $\kappa_i$, respectively, at t=i. Similarly, the interpolant p(t) has a direction and curvature equal to $d_{i+1}$, and $\kappa_{i+1}$, respectively, at t=i+1.

More particularly as to identifying points $b_0$, $b_1$, $b_2$, $b_3$ and $b_4$, the requirements of interpolation of position and tangent can result in relations among the coefficients $b_j$, which can be written as follows:

$$b_0 = f_0 \text{ and } b_4 = f_1 b_1 = (1-\rho_0)b_0 + \rho_0 \tilde{b} \text{ and } b_3 = (1-\rho_1)b_4 + \rho_1 \tilde{b} \qquad (5)$$

for some $0<\rho_0, \rho_1 \leq 1$, where $\rho_0$ and $\rho_1$ represent weights in writing $b_1$ and $b_3$ as convex combinations of $b_0$, $b_4$ and $\tilde{b}$. Further, as shown in equation (5), a control point $\tilde{b}$ can be defined as a point at the intersection of a line through point $f_0$ parallel to direction $d_0$, and a line through point $f_1$ and parallel to direction $d_1$. More particularly, control point $\tilde{b}$ can be defined as follows:

$$\tilde{b} := \frac{(f_1 \times d_1)d_0 + (d_0 \times f_0)d_1}{d_0 \times d_1}$$

According to embodiments of the present invention, $b_2$ is identified to preserve convexity in the interpolant. In this regard, $b_2$ is typically identified as a point within a region bounded by a triangular shape defined by points $\tilde{b}$, $b_1$ and $b_3$. As used herein, within a region bounded by a triangular shape, $b_2$ shall lie either within the interior or on the boundary of the triangular shape defined by points $\tilde{b}$, $b_1$ and $b_3$. More particularly, $b_2$ is typically identified such that the following condition is met to preserve convexity:

$$b_2 = \alpha_0 b_1 + \alpha_1 b_3 + (1 - \alpha_0 - \alpha_1)\tilde{b} \quad (6)$$

for some $\alpha_0$, $\alpha_1 \geq 0$ satisfying $\alpha_0 + \alpha_1 \leq 1$, as shown in FIG. 4. In this regard, $\alpha_0$ and $\alpha_1$ represent weights in writing $b_2$ as a convex combination of $b_1$, $b_3$ and $\tilde{b}$. Now, in order to meet the curvature requirements at the endpoints, $\kappa_i$ may be determined as follows:

$$\kappa_0 = \frac{3d_0 \times (b_2 - b_1)}{4|b_1 - b_0|^2} \quad \text{and} \quad \kappa_1 = \frac{3(b_3 - b_2) \times d_1}{4|b_4 - b_3|^2}$$

Substituting $$b_2 - b_1 = (1 - \alpha_0)(\tilde{b} - b_1) + \alpha_1(b_3 - \tilde{b})$$
$$= (1 - \alpha_0)(1 - \rho_0)(\tilde{b} - b_0) + \alpha_1(1 - \rho_1)(b_4 - \tilde{b})$$
$$b_3 - b_2 = \alpha_0(\tilde{b} - b_1) + (1 - \alpha_1)(b_3 - \tilde{b})$$
$$= \alpha_0(1 - \rho_0)(\tilde{b} - b_0) + (1 - \alpha_1)(1 - \rho_1)(b_4 - \tilde{b})$$

into the equations for $\kappa_0$ and $\kappa_1$ above, $\kappa_0$ and $\kappa_1$ can now be determined according to the following:

$$\kappa_0 = \frac{3\alpha_1(1-\rho_1)d_0 \times (b_4 - \tilde{b})}{4\rho_0^2|\tilde{b} - b_0|^2} \quad \text{and} \quad \kappa_1 = \frac{3\alpha_0(1-\rho_0)(\tilde{b} - b_0) \times d_1}{4\rho_1^2|b_4 - \tilde{b}|^2} \quad (7)$$

Then, $R_0$ and $R_1$ can be defined as follows:

$$R_0 := \frac{4\kappa_0|\tilde{b} - b_0|^2}{3d_0 \times (b_4 - \tilde{b})} \quad \text{and} \quad R_1 := \frac{4\kappa_1|b_4 - \tilde{b}|^2}{3(\tilde{b} - b_0) \times d_1} \quad (8)$$

With $R_0$ and $R_1$ defined according to equation (8), equation (7) can be solved for $\alpha_0$ and $\alpha_1$ such that $\alpha_0$ and $\alpha_1$ can be determined according to the following equation (9):

$$\alpha_0 = \frac{R_1 \rho_1^2}{1 - \rho_0} \quad \text{and} \quad \alpha_1 = \frac{R_0 \rho_0^2}{1 - \rho_1} \quad (9)$$

Therefore, on each segment, $f_i$ to $f_{i+1}$, any value of $\rho_0$ and $\rho_1$ may be used, subject to the following conditions:

$$0 < \rho_0, \rho_1 < 1 \quad \text{and} \quad \frac{R_1 \rho_1^2}{1 - \rho_0} + \frac{R_0 \rho_0^2}{1 - \rho_1} \leq 1 \quad (10)$$

Then, if the Bezier coefficients are prescribed as above, the resultant spline p will be $C^2$-continuous (with respect to arclength) and will interpolate p(t) over the interval [0, 1], as in equation (2).

It should be noted that the conditions of (10) always have infinitely many solutions. For example, the sum in the second condition is equal to one when the following is true:

$$\rho_0 = \rho_1 = \rho_{cnt} = \frac{\sqrt{1 + 4(R_0 + R_1)} - 1}{2(R_0 + R_1)} \quad (11)$$

And since $0 < \rho_{cnt} < 1$, and the sum in the second condition of (10) is increasing in $\rho_0$ and $\rho_1$, any choice satisfying $0 < \rho_0, \rho_1 \leq \rho_{cnt}$ can result in a valid interpolant p. It should be noted that these are not the only possible solutions and, as such, should not be taken to limit the scope of the present invention.

As described above, one aspect of the present invention provides a method of interpolating a position, tangent and curvature by a twice continuously differentiable quartic spline. In one advantageous embodiment, the values of $\rho_0$ and $\rho_1$ are defined such that the interpolant p is sixth-order accurate. According to this embodiment, suppose f comprises a smooth parametric curve with non-vanishing curvature, and $t_i$ is an increasing sequence of parameter values. Let $f_i$, $d_i$ and $\kappa_i$ be given as in equation (1) above, and define the following:

$$h_i := |f_{i+1} - f_i| \quad \text{and} \quad h := \max_i h_i$$

where $h_i$ represents local step sizes or the distances between adjacent points, and h represents the maximum distance between any two adjacent points over all of i. For each segment, $f_i$ to $f_{i+1}$, then, $\rho_0$ and $\rho_1$ can be defined to achieve sixth-order accuracy of interpolant p(t) if the conditions in (10) are met, and the following equation (12) is satisfied:

$$\rho_0 = \rho_1 = \frac{1}{2} + A_i h_i^2 + O(h_i^3) \quad (12)$$

where $A_i$ is bounded uniformly in h. Also in equation (12), the term O, often referred to as "big-O," represents a measure of the difference between $\rho_0$ or $\rho_1$ and the quantity $\frac{1}{2} + A_i h_i^2$, as such is defined by how much closer $\rho_0$ or $\rho_1$ gets to $\frac{1}{2} + A_i h_i^2$ as the number of known data points on f (i.e., $f_i$, $f_{i+1}$, etc.) increase. As such, the term $O(h_i^3)$ in equation (12)

indicates that $\rho_0$ and $\rho_1$ get $g^3$ times closer to $\frac{1}{2}+A_i h_i^2$ if the number of known data points on f increases by a factor of g. By so defining $\rho_0$ and $\rho_1$, the following conclusion holds:

$$\text{dist}(f, p) = O(h^6). \qquad (5)$$

In other terms, by defining $p_0$ and $p_1$ to satisfy (10) and (12), the distance between f and the interpolant p(t) is sixth order accurate such that if the number of known data points of f increase by a factor of g, the interpolant will get $g^6$ times closer to f. The distance between f and the interpolant p(t) can be defined in any of a number of different known manners, including according to the Hausdorff technique.

To illustrate that defining $\rho_0$ and $\rho_1$ as in (12) results in sixth order accuracy of the interpolant p, assume that the curve f is smooth with $|\kappa| \geq c > 0$, where c represents a measure of curvature bounded away from zero. Parameterizing f by arclength s, then, results in the following:

$$f'(s) := \begin{bmatrix} \cos\theta(s) \\ \sin\theta(s) \end{bmatrix}$$

with $\theta$ defined as the indefinite integral of the curvature, $$\theta'(s) = \kappa(s).$$

Again considering only one interval, designated $f_0$ to $f_1$, it can be assumed without loss of generality that f(0) is halfway along the arc from $f_0$ to $f_1$ so that $f_0 = f(-\epsilon)$ and $f_1 = f(\epsilon)$ for some $\epsilon > 0$. Then, $|f_1 - f_0| = 2\epsilon + O(\epsilon^3)$ so that defining $\rho_0$ and $\rho_1$ to satisfy (10) and (12) results in $\text{dist}(f, p_f) = O(\epsilon^6)$. It can also be assumed without loss of generality that $\theta(0) = 0$, i.e., that $$f''(0) = \begin{bmatrix} 1 \\ 0 \end{bmatrix}.$$

Under such assumptions, the second coordinates of the curve f and the interpolant p can be considered as functions of their first coordinates by the implicit function theorem (for sufficiently small $\epsilon$). That is, each curve can be parameterized by its first coordinate:

$$p : \xi \mapsto \begin{bmatrix} \xi \\ y_p(\xi) \end{bmatrix} \text{ and } f : \xi \mapsto \begin{bmatrix} \xi \\ y_f(\xi) \end{bmatrix}.$$

From this point of view, the function $y_p$ matches $y_f$ to third order at two values of $\xi$ that are $O(\epsilon)$ apart. As such, by the standard error estimate for two-point Hermite interpolation, the error is of order $O(\epsilon^6)$ provided that $d^6 y_p/d\xi^6$ is bounded uniformly in $\epsilon$.

Considering the Bezier form of the quartic polynomial p, $$p(t) = \begin{bmatrix} x(t) \\ y(t) \end{bmatrix} = \sum_{j=0}^{4} b_j B_j(t),$$

$d^n y_p/d\xi^n$ is a linear combination of the functions:

$$\left\{ \frac{y^{(i)} \prod_{\upsilon=1}^{n-1} x^{(j_\upsilon)}}{(x')^{2n-1}} : 1 \leq i, j_\upsilon \leq 4; i + \sum_{\upsilon=1}^{n-1} j_\upsilon = 2n - 1 \right\}$$

for any $n \geq 1$, as can be verified by inductively applying the chain rule, as such is known to those skilled in the art. In particular, the terms in $d^6 y_p/d\xi^6$ are of the form:

$$\frac{y^{(i)} \prod_{\upsilon=1}^{5} x^{(j_\upsilon)}}{(x')^{11}}$$

where $i + \Sigma_\upsilon j_\upsilon = 11$ and $1 \leq i, j_\upsilon \leq 4$. The boundedness of these expressions can then be determined from the following assertions:

$$p'(t) = \begin{bmatrix} \frac{1}{2}\varepsilon \\ 0 \end{bmatrix} + O(\varepsilon^2) \text{ and } |p^{(i)}(t)| = O(\varepsilon^i) \text{ for } i = 2, 3, 4 \qquad (13)$$

To illustrate how the assertions hold true, consider that the Bezier coefficients of the derivatives of p are as follows:

p': $4(b_1-b_0)4(b_2-b_1)4(b_3-b_2)4(b_4-b_3)$ p'': $12(b_2-2b_1+b_0)12(b_3-2b_2+b_3)12(b_4-2b_3+b_2)$ p''': $24(b_3-3b_2+3b_1-b_0)24(b_3-3b_2+3b_1-b_0)$ p'''': $24(b_4-4b_3+6b_2-4b_1+b_0)$

Each of the Bezier coefficients can be expressed in terms of:

$\upsilon_0 = \tilde{b} - b_0$ and $\upsilon_1 = b_4 - \tilde{b}$ by noting that:

$b_1 - b_0 = \rho \upsilon_0,$ $b_2 - b_1 = (1-\rho)[(1-\alpha_0)\upsilon_0 + \alpha_1 \upsilon_1],$ $b_3 - b_2 = (1-\rho)[\alpha_0 \upsilon_0 + (1-\alpha_1)\upsilon_1]$ and $b_4 - b_3 = \rho \upsilon_1.$ Also, from the definition of $\tilde{b}$, it can be shown that:

$$\upsilon_0 = \frac{a \times d_1}{d_0 \times d_1} d_0 \text{ and } \upsilon_1 = \frac{d_0 \times a}{d_0 \times d_1} d_1,$$

where $a := f_1 - f_0$.

To expand the coefficients of $p^{(i)}$ in terms of $\epsilon$, $\theta$ is initially expanded to the third order at s=0, $\theta(s) = \theta_1 s + \theta_2 s^2 + \theta_3 s^3 + O(s^4),$ where $\theta_k := \theta^{(k)}(0)/k!$ is independent of s. Then, from the definitions, it can be shown that:

$$d_0 = \begin{bmatrix} \cos\theta(-\varepsilon) \\ \sin\theta(-\varepsilon) \end{bmatrix} = \begin{bmatrix} 1 - \frac{\theta_1^2}{2}\varepsilon^2 + \theta_1\theta_2\varepsilon^3 \\ -\theta_1\varepsilon + \theta_2\varepsilon^2 - (\theta_3 - \theta_1^3/6)\varepsilon^3 \end{bmatrix} + O(\varepsilon^4),$$

$$d_1 = \begin{bmatrix} \cos\theta(\varepsilon) \\ \sin\theta(\varepsilon) \end{bmatrix} = \begin{bmatrix} 1 - \frac{\theta_1^2}{2}\varepsilon^2 - \theta_1\theta_2\varepsilon^3 \\ \theta_1\varepsilon + \theta_2\varepsilon^2 + (\theta_3 - \theta_1^3/6)\varepsilon^3 \end{bmatrix} + O(\varepsilon^4),$$

$$a = \int_{-\varepsilon}^{\varepsilon} \begin{bmatrix} \cos\theta(\sigma) \\ \sin\theta(\sigma) \end{bmatrix} d\sigma = \begin{bmatrix} 2\varepsilon - \frac{\theta_1^2}{3}\varepsilon^3 \\ \frac{2\theta_2}{3}\varepsilon^3 \end{bmatrix} + O(\varepsilon^5).$$

Thereafter, the following expansions can be determined:

$$d_0 \times d_1 = 2\theta_1\varepsilon + \left(2\theta_3 - \frac{4\theta_1^3}{3}\right)\varepsilon^3 + O(\varepsilon^5),$$

$$d_0 \times a = 2\theta_1\varepsilon^2 - \frac{4}{3}\theta_2\varepsilon^3 + \left(2\theta_3 - \frac{2}{3}\theta_1^3\right)\varepsilon^4 + O(\varepsilon^5) \text{ and}$$

$$a \times d_1 = 2\theta_1\varepsilon^2 + \frac{4}{3}\theta_2\varepsilon^3 + \left(2\theta_3 - \frac{2}{3}\theta_1^3\right)\varepsilon^4 + O(\varepsilon^5).$$

Next, the vectors $\upsilon_0$ and $\upsilon_1$ can be determined as follows:

$$\upsilon_0 = \frac{a \times d_1}{d_0 \times d_1} d_0 = \begin{bmatrix} \varepsilon + \frac{2\theta_2}{3\theta_1}\varepsilon^2 - \frac{\theta_1^2}{6}\varepsilon^3 \\ -\theta_1\varepsilon^2 + \frac{\theta_2}{3}\varepsilon^3 \end{bmatrix} + O(\varepsilon^4),$$

$$\upsilon_1 = \frac{d_0 \times a}{d_0 \times d_1} d_1 = \begin{bmatrix} \varepsilon - \frac{2\theta_2}{3\theta_1}\varepsilon^2 - \frac{\theta_1^2}{6}\varepsilon^3 \\ \theta_1\varepsilon^2 + \frac{\theta_2}{3}\varepsilon^3 \end{bmatrix} + O(\varepsilon^4).$$

It will be noted that in the above equations for $\upsilon_0$ and $\upsilon_1$, it is presumed that $\kappa \neq 0$, as otherwise the numerator vanishes for some value of $s \in [-\varepsilon, \varepsilon]$.

Now, since $\kappa(s) = \theta'(s)$, $\kappa_0$ and $\kappa_1$ can be determined as follows:

$\kappa_0 = \kappa(-\epsilon) = \theta_1 - 2\theta_2\epsilon + 3\theta_3\epsilon^3 + O(\epsilon^3)$, and $\kappa_1 = \kappa(\epsilon) = \theta_1 + 2\theta_2\epsilon + 3\theta_3\epsilon^3 + O(\epsilon^3)$.

Based upon the definitions of $R_0$ and $R_1$ in equation (8) and the foregoing expressions for $\kappa_0$ and $\kappa_1$, $R_0$ and $R_1$ can be rewritten as follows:

$$R_0 = \frac{4}{3} \frac{\kappa_0 (a \times d_1)^2}{(d_0 \times a)(d_0 \times d_1)^2} = \frac{2}{3} + \frac{2(9\theta_1^4 - 20\theta_2^2 + 18\theta_1\theta_3)}{27\theta_1^2}\varepsilon^2 + O(\varepsilon^3),$$

$$R_1 = \frac{4}{3} \frac{\kappa_1 (d_0 \times a)^2}{(a \times d_1)(d_0 \times d_1)^2} = \frac{2}{3} + \frac{2(9\theta_1^4 - 20\theta_2^2 + 18\theta_1\theta_3)}{27\theta_1^2}\varepsilon^2 + O(\varepsilon^3).$$

Combining the foregoing equations for $R_0$ and $R_1$ with the definition of $\rho_0$ and $\rho_1$ from equation (12) gives:

$$\alpha_i = \frac{R_i \rho}{1-\rho} = \frac{1}{3} + \left(2A_0 + \frac{\theta_1^2}{3} - \frac{20\theta_2^2}{27} + \frac{\theta_3}{3\theta_1}\right)\varepsilon^2 + O(\varepsilon^3)$$

In turn, the difference between consecutive points $b_i$ can be determined as follows:

$$b_1 - b_0 = \rho\upsilon_0 = \begin{bmatrix} \frac{1}{2}\varepsilon + \frac{\theta_2}{3\theta_1}\varepsilon^2 + \left(A_0 - \frac{\theta_1^2}{12}\right)\varepsilon^3 \\ -\frac{\theta_1}{2}\varepsilon^2 + \frac{\theta_2}{6}\varepsilon^3 \end{bmatrix} + O(\varepsilon^4),$$

$$b_2 - b_1 = (1-\rho)[(1-\alpha_0)\upsilon_0 + \alpha_1\upsilon_1]$$

$$= \begin{bmatrix} \frac{1}{2}\varepsilon + \frac{\theta_2}{9\theta_1}\varepsilon^2 - \left(A_0 + \frac{\theta_1^2}{12}\right)\varepsilon^3 \\ -\frac{\theta_1}{6}\varepsilon^2 + \frac{\theta_2}{6}\varepsilon^3 \end{bmatrix} + O(\varepsilon^4),$$

$$b_3 - b_2 = (1-\rho)[\alpha_0\upsilon_0 + (1-\alpha_0)\upsilon_1]$$

$$= \begin{bmatrix} \frac{1}{2}\varepsilon - \frac{\theta_2}{9\theta_1}\varepsilon^2 - \left(A_0 + \frac{\theta_1^2}{12}\right)\varepsilon^3 \\ \frac{\theta_1}{6}\varepsilon^2 + \frac{\theta_2}{6}\varepsilon^3 \end{bmatrix} + O(\varepsilon^4) \text{ and}$$

$$b_4 - b_3 = \rho\upsilon_1 = \begin{bmatrix} \frac{1}{2}\varepsilon - \frac{\theta_2}{3\theta_1}\varepsilon^2 + \left(A_0 - \frac{\theta_1^2}{12}\right)\varepsilon^3 \\ \frac{\theta_1}{2}\varepsilon^2 + \frac{\theta_2}{6}\varepsilon^3 \end{bmatrix} + O(\varepsilon^4).$$

From the foregoing equations, it follows that $$b_{j+1} - b_j = \begin{bmatrix} \frac{1}{2}\varepsilon \\ 0 \end{bmatrix} + O(\varepsilon^2),$$

$|b_{j+2} - 2b_{j+1} + b_j| = O(\epsilon^2)$, $|b_{j+3} - 3b_{j+2} + 3b_{j+1} - b_j| = O(\epsilon^3)$ and $|b_{j+4} - 4b_{j+3} + 6b_{j+2} - 4b_{j+1} + b_j| = O(\epsilon^4)$.

As shown from the foregoing, then, the foregoing equations satisfy the assertions in (13) above.

Now suppose that the data came from endpoints of an arc of angle $\theta < \pi$ of some circle of curvature $\kappa$. According to another embodiment of the present invention, to preserve the symmetry of such a situation, $\rho_0$ and $\rho_1$ can be defined such that $\rho_0 = \rho_1 =: \rho$. The heuristic choice of a favorable $\rho$ can force the curvature of the interpolant to be $\kappa$ at the midpoint, that is, $p^{**}(\frac{1}{2}) = \kappa_i$. In terms of the spline coefficients, one can verify that $$p'(1/2) = \frac{b_4 + 2b_3 - 2b_1 - b_0}{2} \text{ and } p''(1/2) = 3(b_4 - 2b_2 + b_0).$$

For any fixed choice of $\rho_0$ and $\rho_1$, the construction devised above is scale-invariant (provided the curvature is scaled by $1/s$ to correspond to a scaling by s in the relative positions). So without loss of generality, it can be assumed that $\kappa = 1$. The construction is also invariant under translation and rotation, so it can be assumed that $f_0=(0,0)$, $d_0=(1,0)$, $f_1=(\sin\theta, 1-\cos\theta)$, $d_1=(\cos\theta,\sin\theta)$ and $\kappa_0=\kappa_1=1$.

In such a case, as shown in FIG. 5, $b_0=(0,0)$, $b_4=(\sin\theta,1-\cos\theta)$ and $\bar{b}=(\sin\theta/(1+\cos\theta),0)$.

From equations (8) and (9) above, $R_0=R_1=4/3(1+\cos\theta)$ and $$\alpha_0 = \alpha_1 = \alpha := \frac{4\rho^2}{3(1-\rho)(1+\cos\vartheta)}.$$

Defining $\upsilon_0:=\bar{b}-b_0$ and $\upsilon_1:=\bar{b}-b_4$, $b_1$ and $b_3$ can be determined as follows:

$b_1=b_0+\rho\upsilon_0$, and $b_3=b_4+\rho\upsilon_1$. And since $\upsilon_0-\upsilon_1=b_4-b_0$, $b_4+2b_3-2b_1-b_0=(3-2\rho)(\upsilon_0-\upsilon_1).$ From equation (6), then, $b_2=\bar{b}-\alpha(1-\rho)(\upsilon_0+\upsilon_1)$. Therefore, it can be shown that:

$$b_4 - 2b_2 + b_0 = -(1-2\alpha(1-\rho))(\upsilon_0+\upsilon_1) = -\left(1 - \frac{8\rho^2}{3(1+\cos\vartheta)}\right)(\upsilon_0+\upsilon_1).$$

Consequently, the first and second derivatives for the interpolant p at $t=\frac{1}{2}$ can be determined as follows:

$$p'(1/2) = \frac{(3-2\rho)(\upsilon_0-\upsilon_1)}{2} \quad \text{and} \quad p''(1/2) = -\left(3 - \frac{8\rho^2}{1+\cos\vartheta}\right)(\upsilon_0+\upsilon_1).$$

Since $|\upsilon_0|=|\upsilon_1|$, it can also be shown that $\upsilon_0-\upsilon_1$ and $\upsilon_0+\upsilon_1$ are orthogonal, Therefore, $(\upsilon_0-\upsilon_1)\times(\upsilon_0+\upsilon_1)=-|\upsilon_0-\upsilon_1|\cdot|\upsilon_0+\upsilon_1|$. It can further be shown that $$p^{**}(1/2) = \frac{p'(1/2) \times p''(1/2)}{|p'(1/2)|^3}$$

$$= \frac{\left(\frac{3-2\rho}{2}\right)\left(3 - \frac{8\rho^2}{1+\cos\vartheta}\right)|\upsilon_0-\upsilon_1||\upsilon_0+\upsilon_1|}{\frac{1}{8}(3-2\rho)^3|\upsilon_0-\upsilon_1|^3}$$

$$= \frac{4\left(3 - \frac{8\rho^2}{1+\cos\vartheta}\right)|\upsilon_0+\upsilon_1|}{(3-2\rho)^2|\upsilon_0-\upsilon_1|^2}.$$

By noting that $$\rho \neq \frac{3}{2}$$

and substituting in $$|\upsilon_0-\upsilon_1| = \sqrt{2(1-\cos\vartheta)} \quad \text{and} \quad |\upsilon_0+\upsilon_1| = \frac{2(1-\cos\vartheta)}{\sqrt{2(1+\cos\vartheta)}},$$

the above equation for $p^{}(\frac{1}{2})$ can be simplified to the following quadratic equation when $p^{}(\frac{1}{2})$ is set equal to 1:

$$\left(\sqrt{2(1-\cos\vartheta)} + \frac{8}{1+\cos\vartheta}\right)\rho^2 - 3\sqrt{2(1+\cos\vartheta)}\,\rho + \left(\frac{9}{4}\sqrt{2(1+\cos\vartheta)} - 3\right) = 0.$$

The larger solution of the foregoing quadratic equation can then be denoted by $\rho_{opt}(\theta)$, where $$0 < \rho_{opt}(\vartheta) \leq \frac{1}{2}$$

for all $-\pi<\theta<\pi$.

It is advantageous that $\rho_0\rho_1=\rho_{opt}(\theta)$ for circular data as above, and that the resulting interpolant provides sixth order accuracy in general. Therefore, $\rho_0$ and $\rho_1$ can be defined to continuously depend on the data and meet the circular data requirement (as defined in equation 12). Therefore, for general data, it can be shown that $$\rho_0 = \rho_1 = \rho := \rho_{crit} \cdot \left(\frac{\rho_{opt}(\vartheta)}{\rho_{crit}(\vartheta)}\right) \tag{14}$$

where $\theta$ is the angle between $d_0$ and $d_1$, and $\rho_{cnt}(\theta)$ is defined as $\rho_{cnt}$ for a circular arc of angle $\theta$. More particularly, $$\rho_{crit}(\vartheta) = \frac{3\left(\sqrt{1+\frac{32}{3(1+\cos\vartheta)}}-1\right)(1+\cos\vartheta)}{16}$$

(see equation (11)). The preceding equation results in a favorable choice of $\rho$ for circular data and necessarily satisfies $0<\rho_0, \rho_1<\rho_{cnt}$ (see FIG. 6 for a plot of $\rho_{opt}(\theta)/\rho_{cnt}(\theta)$ for $-\pi<\theta<\pi$).

As indicated above, embodiments of the present invention provide an interpolant with sixth order accuracy. As will be appreciated, many different techniques for choosing $\rho$ can provide the same accuracy, including the particularly simple choice $\rho_0=\rho_1=\min\{\frac{1}{2}, \rho_{cnt}\}$. Empirically, such a choice tends to produce overly flat curves for sparse data sets. The fact that the interpolant is sixth-order accurate follows from the above, and the claim that, supposing f is a smooth parameteric curve with non-vanishing curvature, then $\rho$ as defined in equation (14) satisfies the following equation (15):

$$\rho = \frac{1}{2} + Ah^2 + O(h^3) \quad (15)$$

for some $A \in 1R$ independent of h.

To illustrate how the interpolant is sixth-order accurate by demonstrating that $\rho$ satisfies equation (15), consider that $\cos \theta = <d_0, d_1>$, the inner product of the vectors $d_0$ and $d_1$. As such, from the expansions $d_0 \times d_1$, $d_0 \times \alpha$ and $\alpha \times d_1$ described above, $$\cos \theta = 1 - 2\theta_1^2 h^2 + O(h^4).$$

Now, letting a, b and c denote the coefficients in the quadratic equation that defines $\rho_{opt}(\theta)$, it can be shown that:

$$a = 6 + 3\theta_1^2 h^2 + O(h^4), \; b = -6 + 3\theta_1^2 h^2 + O(h^4), \; \text{and}$$

$$c = \frac{3}{2} - \frac{9}{4}\theta_1^2 h^2 + O(h^4).$$

Therefore, $$\rho_{opt}(\vartheta) = \frac{\sqrt{b^2 - 4ac} - b}{2a} = \frac{1}{2} - \frac{1}{2}\theta_1^2 h^2 + O(h^4).$$

As above, $$R_i = \frac{2}{3} + \frac{2(9\theta_1^4 - 20\theta_2^2 + 18\theta_1\theta_3)}{27\theta_1^2} h^2 + O(h^4)$$

for any curve, so $\rho_{cnt}$ can be defined as:

$$\rho_{crit} = \frac{\sqrt{57} - 3}{8} + O(h^2).$$

Since $\theta = O(h)$ for any fixed sufficiently smooth curve, $$\rho_{cnt}/\rho_{cnt}(\theta) = 1 + O(h^2).$$

Therefore, continuing with a more rigorous examination, it can be shown that $$\rho_i = \frac{1}{2} + O(h^2).$$

As described above, points $b_0$, $b_1$, $b_2$, $b_3$ and $b_4$ are based upon the pair of positions ($f_0$, $f_1$) and associated directions ($d_0$, $d_1$) and curvatures ($\kappa_0$, $\kappa_1$). In turn, the interpolant p(t) is determined over the interval ($0 \leq t \leq 1$) based upon points $b_0$, $b_1$, $b_2$, $b_3$ and $b_4$ to thereby model a respective section of the curve. As such, it will be appreciated that the interpolant depends indirectly on the positions ($f_0$, $f_1$) and associated directions ($d_0$, $d_1$) and curvatures ($\kappa_0$, $\kappa_1$). Advantageously, then, a change in the interpolant p(t) is directly proportional to a change in the positions ($f_i$, $f_{i+1}$), directions ($d_i$, $d_{i+1}$) and curvatures ($\kappa_i$, $\kappa_{i+1}$). In other terms, the interpolant depends continuously on the data (i.e., the positions, directions and curvatures). As such, small changes in any of the data (positions, directions and/or curvatures) will not produce large changes to the interpolant.

As will also be appreciated, the system, method and computer program product of embodiments of the present invention can have any of a number of different applications. For example, embodiments of the present invention can be utilized to provide a parametric family of curves for use in the design of aircraft, rotorcraft, spacecraft, automobiles, maritime vehicles, or the like. Thus, according to one typical scenario, the system, method and computer program product of embodiments of the present invention can be utilized to design an airfoil along a wing of a prospective aircraft. Initially, then, the airfoil can be specified by a plurality of data points, including a position, direction and curvature for each point. Thus, presuming the airfoil is specified by ten points, the points according to one exemplar embodiment may appear as in FIG. 7A and Table 1, below, with the curve fit according to embodiments of the present invention shown in FIG. 7B.

TABLE 1

| i | $f_i$ | $d_i$ | $k_i$ |
|---|---|---|---|
| 0 | (1.00, 0.00322) | (−0.756, 0.655) | 0.0677 |
| 1 | (0.552, 0.337) | (−0.8577, 0.5141) | 0.311 |
| 2 | (0.220, 0.468) | (−1.00, 0.00) | 4.32 |
| 3 | (0.0617, 0.350) | (−0.433, −0.901) | 3.16 |
| 4 | (0.00, 0.00) | (0.00, −1.00) | 0.391 |
| 5 | (0.0676, −0.403) | (0.537, −0.844) | 4.73 |
| 6 | (0.316, −0.539) | (1.00, 0.00) | 5.43 |
| 7 | (0.514, −0.451) | (0.796, 0.605) | 1.19 |
| 8 | (0.728, −0.243) | (0.676, 0.737) | 0.00 |
| 9 | (1.00, 0.00) | (0.942, 0.336) | −5.23 |

Each data point can be represented by a circular arc of the appropriate curvature centered at the appropriate position and tangent to the appropriate direction vector at the respective point. The curve defined by the data points and the interpolation technique of embodiments of the present invention can be considered to be a member of a 40-parameter family of curves. In this regard, the parameters consist of the position (x and y coordinates), direction (a single parameter since $|d_i|=1$), and curvature at each point. In fact, not all parameters are active in such a case. Namely, the following parameters can be held in position: $x_0 = x_9 = 1$, $x_4 = y_0 = y_4 = y_9 = 0$, $d_2 = (-1, 0)$, $d_4 = (0, -1)$, $d_6 = (1, 0)$ and $\kappa_8 = 0$. As such, the number of parameters can be reduced from 40 to 30. It will be noted that it has been found that such a 30-parameter family of curves is sufficiently robust to model airfoils for a wide variety of aircraft. While advantageous to accurately model airfoils, the system, method and computer program product can be utilized to model a wide variety of other surfaces for other applications, including automotive applications and the like.

In another typical scenario, the curve $$f(t) = \begin{bmatrix} t \\ e^t \end{bmatrix} \quad (0 \leq t \leq 1)$$

is interpolated to empirically demonstrate the sixth order accuracy of the interpolation technique. The results of such interpolation are shown in Table 2, below.

TABLE 2

| Points | $\rho_{min}$ | $\rho_{max}$ | Error $e_i$ | $\dfrac{e_{i-1}}{e_i}$ | $\log_2 \dfrac{e_{i-1}}{e_i}$ |
|---|---|---|---|---|---|
| 2 | .508499 | .508499 | 9.5738 × 10$^{-6}$ | | |
| 3 | .502127 | .502150 | 1.6097 × 10$^{-7}$ | 59.476 | 5.8942 |
| 5 | .500531 | .500539 | 2.5669 × 10$^{-9}$ | 62.710 | 5.9706 |
| 9 | .500133 | .500135 | 4.0367 × 10$^{-11}$ | 63.589 | 5.9907 |

As shown in Table 2, the first column specifies the number of knots interpolated at, where the knots were distributed uniformly in t. The next two columns specify the minimum and maximum ρ used on any of the intervals. The fourth column is the maximum error over the interval. Finally, the fifth and sixth columns display (or at least suggest) the sixth-order rate of convergence. Note that $$\rho = \frac{1}{2} + O(h^2)$$

was shown above.

Therefore, embodiments of the present invention are capable of modeling each section of a curve f to exactly match the positions, directions and curvatures for data provided for the respective section. Embodiments of the present invention are also capable of modeling each section of the curve to thereby preserve the shape properties of the curve f, such as by maintaining the convexity in the modeled section. In addition, by modeling sections of a curve, embodiments of the present invention can advantageously model the curve such that changes in the provided data only affect the curve locally. Embodiments of the present invention are further capable of modeling each section such that the model depends continuously on the data, and such that the model has sixth-order accuracy.

As shown in FIG. 8, the system of the present invention is typically embodied by a processing element and an associated memory device, both of which are commonly comprised by a computer 20 or the like. In this regard, as indicated above, the method of embodiments of the present invention can be performed by the processing element manipulating data stored by the memory device with any one of a number of commercially available computer software programs. The computer can include a display 22 for presenting information relative to performing embodiments of the method of the present invention, including the various distributions, models and/or conclusions as determined according to embodiments of the present invention. To plot information relative to performing embodiments of the method of the present invention, the computer can further include a printer 24.

Also, the computer 20 can include a means for locally or remotely transferring the information relative to performing embodiments of the method of the present invention. For example, the computer can include a facsimile machine 26 for transmitting information to other facsimile machines, computers or the like. Additionally, or alternatively, the computer can include a modem 28 to transfer information to other computers or the like. Further, the computer can include an interface (not shown) to a network, such as a local area network (LAN), and/or a wide area network (WAN). For example, the computer can include an Ethernet Personal Computer Memory Card International Association (PCM-CIA) card configured to transmit and receive information to and from a LAN, WAN or the like.

According to one aspect of the present invention and as mentioned above, the system of the present invention, such as a processing element typically embodied by a computer, generally operates under control of a computer program product. The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIG. 1 is a flowchart of methods, systems and program products according to the invention. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of modeling at least one section of a curve f, wherein modeling a section comprises:

providing a pair of positions ($f_i$, $f_{i+1}$) of the section of the curve to be modeled, and additionally providing associated directions ($d_i$, $d_{i+1}$) and curvatures ($\kappa_i$, $\kappa_{i+1}$), of the section of the curve, the pair of positions ($f_i$, $f_{i+1}$) and directions ($d_i$, $d_{i+1}$) and curvatures ($\kappa_i$, $\kappa_{i+1}$) being related to a structure being designed;

identifying points $b_0$, $b_1$, $b_2$, $b_3$ and $b_4$ based upon the provided pair of positions ($f_i$, $f_{i+1}$) and the provided directions ($d_i$, $d_{i+1}$) and curvatures ($\kappa_i$, $\kappa_{i+1}$) associated with the pair of positions, wherein identifying points $b_0$ and $b_4$ includes setting $b_0$ equal to $f_i$ and $b_4$ equal to $f_{i+1}$, wherein identifying points $b_1$ and $b_3$ includes defining a control point $\tilde{b}$ based upon the pair of positions ($f_i$, $f_{i+1}$) and directions ($d_i$, $d_{i+1}$), identifying point $b_1$ on a segment $\overline{b_0 \tilde{b}}$, and identifying point $b_3$ on a segment $\overline{b_4 \tilde{b}}$, where points $b_1$ and $b_3$ are identified further based upon weights ($\rho_0$, $\rho_1$), the weights ($\rho_0$, $\rho_1$) being defined such that:
  (a) each weight approaches a value of one-half as a distance between the pair of positions ($f_i$, $f_{i+1}$) approaches zero, and
  (b) the weights continuously depend on the positions ($f_i$, $f_{i+1}$), directions ($d_i$, $d_{i+1}$) and curvatures ($\kappa_i$, $\kappa_{i+1}$), wherein identifying point $b_2$ comprises identifying point $b_2$ based upon points $b_1$ and $b_3$ and the curvatures ($\kappa_i$, $\kappa_{i+1}$), and wherein the weights ($\rho_0$, $\rho_1$) are defined, and the points $b_1$ and $b_3$ identified, further such that:
  (c) point $b_2$ is disposed within a region bounded by a triangular shape defined by points $\tilde{b}$, $b_1$ and $b_3$;

determining a quartic interpolant $p(t)$ over an interval ($i \leq t \leq i+1$) based upon point $b_0$, $b_1$, $b_2$, $b_3$ and $b_4$ to thereby model the section of the curve and facilitate design of the structure, wherein the interpolant $p(t)$ has a position, direction and curvature equal to $f_i$, $d_i$ and $\kappa_i$, respectively, at $t=i$, and wherein the interpolant $p(t)$ has a position, direction and curvature equal to $f_{i+1}$, $d_{i+1}$ and $\kappa_{i+1}$, respectively, at $t=i+1$; and displaying the model of the section of the curve.

2. The method of claim 1, wherein defining a control point $\tilde{b}$ comprises defining a control point $\tilde{b}$ as a point at the intersection of a line through point $f_0$ parallel to direction $d_0$, and a line through point $f_1$ and parallel to direction $d_1$.

3. The method of claim 2, wherein defining a control point comprises determining a control point according to the following:

$$\tilde{b} := \frac{(f_1 \times d_1)d_0 + (d_0 \times f_0)d_1}{d_0 \times d_1}.$$

4. The method of claim 1, wherein identifying a point $b_1$ and a point $b_3$ comprises:

defining weights ($\rho_0$, $\rho_1$), wherein the weights are identified such that $0 < \rho_0$, $\rho_1 \leq 1$; and identifying a point $b_1$ and a point $b_3$ according to the following:

$$b_1 = (1-\rho_0)b_0 + \rho_0 \tilde{b} \text{ and } b_3 = (1-\rho_1)b_4 + \rho_1 \tilde{b}.$$

5. The method of claim 1, wherein identifying a point $b_2$ comprises:

defining weights ($\alpha_0$, $\alpha_1$) based upon the curvatures ($\kappa_i$, $\kappa_{i+1}$), wherein the weights ($\alpha_0$, $\alpha_1$) are defined such that $\alpha_0$, $\alpha_1 \geq 0$ and $\alpha_0 + \alpha_1 \leq 1$; and identifying point $b_2$ according to the following:

$$b_2 = \alpha_0 b_1 + \alpha_1 b_3 + (1 - \alpha_0 - \alpha_1)\tilde{b}.$$

6. The method of claim 5, wherein defining weights ($\alpha_0$, $\alpha_1$) comprises:

defining weights ($\rho_0$, $\rho_1$) such that $0 < \rho_0$, $\rho_1 \leq 1$; and defining weights ($\alpha_0$, $\alpha_1$) according to the following:

$$\alpha_0 = \frac{R_1 \rho_1^2}{1 - \rho_0} \text{ and } \alpha_1 = \frac{R_0 \rho_0^2}{1 - \rho_1},$$

wherein $$R_0 := \frac{4\kappa_i |\tilde{b} - b_0|^2}{3 d_i \times (b_4 - \tilde{b})} \text{ and } R_1 := \frac{4\kappa_{i+1}|b_4 - \tilde{b}|^2}{3(\tilde{b} - b_0) \times d_{i+1}}.$$

7. The method of claim 1, wherein determining an interpolant $p(t)$ comprises determining an interpolant $p(t)$ according to the following:

$$p(t) = \sum_{j=0}^{4} b_j B_j(t),$$

and wherein $$B_j(t) := \binom{4}{j} t^j (1-t)^{(4-j)}.$$

8. The method of claim 1, wherein identifying points $b_0$, $b_1$, $b_2$, $b_3$ and $b_4$ comprises identifying points $b_0$, $b_1$, $b_2$, $b_3$ and $b_4$ such that the quartic interpolant $p(t)$ is sixth-order accurate over the interval ($i \leq t \leq i+1$).

9. The method of claim 1, wherein determining the quartic interpolant $p(t)$ comprises determining the quartic interpolant $p(t)$ such that a change in the interpolant $p(t)$ is directly proportional to a change in at least one of the provided positions ($f_i$, $f_{i+1}$), directions ($d_i$, $d_{i+1}$) and curvatures ($\kappa_i$, $\kappa_{i+1}$).

10. A system for modeling at least one section of a curve $f$ comprising:

a processor configured to receive a pair of positions ($f_i$, $f_{i+1}$) of a section of the curve to be modeled, and additionally receive associated directions ($d_i$, $d_{i+1}$) and curvatures ($\kappa_i$, $\kappa_{i+1}$), of a section of the curve to be modeled, the pair of positions ($f_i$, $f_{i+1}$) and directions ($d_i$, $d_{i+1}$) and curvatures ($\kappa_i$, $\kappa_{i+1}$) being related to a structure being designed, wherein the processor is configured to identify points $b_0$, $b_1$, $b_2$, $b_3$ and $b_4$ based upon the received pair of positions ($f_i$, $f_{i+1}$) and received directions ($d_i$, $d_{i+1}$) and curvatures ($\kappa_i$, $\kappa_{i+1}$) associated with the pair of positions, wherein the processor being configured to identify points $b_0$ and $b_4$ includes being configured to set $b_0$ equal to $f_1$ and $b_4$ equal to $f_{i+1}$, wherein the processor being configured to identify points $b_1$ and $b_3$ includes being configured to define a control point $\tilde{b}$ based upon the pair of positions ($f_i$, $f_{i+1}$) and directions ($d_i$, $d_{i+1}$), identify point $b_1$ on a segment $\overline{b_0 \tilde{b}}$, and identify point $b_3$ on a segment $\overline{b_4 \tilde{b}}$, where points $b_1$ and $b_3$ are identified further based upon weights ($\rho_0$, $\rho_1$), the weights ($\rho_0$, $\rho_1$) being defined such that:
  (a) each weight approaches a value of one-half as a distance between the pair of positions ($f_i$, $f_{i+1}$) approaches zero, and
  (b) the weights continuously depend on the positions ($f_i$, $f_{i+1}$), directions ($d_i$, $d_{i+1}$) and curvatures ($\kappa_i$, $\kappa_{i+1}$), wherein the processor being configured to identify point $b_2$ includes being configured to identify point $b_2$ based upon points $b_1$ and $b_3$ and the curvatures ($\kappa_i$, $\kappa_{i+1}$), and wherein the weights ($\rho_0$, $\rho_1$) are defined, and the points $b_1$ and $b_3$ identified, further such that:
(c) point $b_2$ is disposed within a region bounded by a triangular shape defined by points $\tilde{b}$, $b_1$ and $b_3$,
wherein the processor is also configured to determine a quartic interpolant p(t) over an interval (i≦t≦i+1) based upon points $b_0$, $b_1$, $b_2$, $b_3$ and $b_4$ to thereby model the respective section of the curve and facilitate design of the structure, wherein the interpolant p(t) has a position, direction and curvature equal to $f_i$, $d_i$ and $\kappa_i$, respectively, at t=i, and wherein the interpolant p(t) has a position, direction and curvature equal to $f_i$, $f_{i+1}$, $d_{i+1}$ and $\kappa_{i+1}$, respectively, at t=i+1, and
wherein the processor is configured to output the model of the section of the curve for display.

11. The system of claim 10, wherein the processor is configured to define the control point $\tilde{b}$ as a point at the intersection of a line through point $f_0$ parallel to direction $d_0$, and a line through point $f_1$ and parallel to direction $d_1$.

12. The system of claim 11, wherein the processor is configured to define the control point according to the following:

$$\tilde{b} := \frac{(f_1 \times d_1)d_0 + (d_0 \times f_0)d_1}{d_0 \times d_1}.$$

13. The system of claim 10, wherein the processor is configured to identify points $b_1$ and $b_3$ including being configured to:
define weights ($\rho_0$, $\rho_1$), wherein the weights are identified such that 0<$\rho_0$, $\rho_1$≦1; ad
identify a point $b_1$ and a point $b_3$ according to the following:

$$b_1=(1-\rho_0)b_0+\rho_0\tilde{b} \text{ and } b_3=(1-\rho_1)b_4+\rho_1\tilde{b}.$$

14. The system of claim 10, wherein the processor is configured to identify point $b_2$ including being configured to:
define weights ($\alpha_0$, $\alpha_1$) based upon the curvatures ($\kappa_i$, $\kappa_{i+1}$), wherein the weights ($\alpha_0$, $\alpha_1$) are defined such that $\alpha_0$, $\alpha_1$≧0 and $\alpha_0$+$\alpha_1$≦1; and
identify point $b_2$ according to the following:

$$b_2=\alpha_0 b_1+\alpha_1 b_3+(1-\alpha_0-\alpha_1)\tilde{b}.$$

15. The system of claim 14, wherein the processor is configured to define weights ($\alpha_0$, $\alpha_1$) including being configured to:
define weights ($\rho_0$, $\rho_1$) such that 0<$\rho_0$, $\rho_1$≦1; and
define weights ($\alpha_0$, $\alpha_1$) according to the following:

$$\alpha_0 = \frac{R_1 \rho_1^2}{1-\rho_0} \text{ and } \alpha_1 = \frac{R_0 \rho_0^2}{1-\rho_1},$$

wherein $$R_0 := \frac{4\kappa_i |\tilde{b}-b_0|^2}{3 d_i \times (b_4 - \tilde{b})} \text{ and } R_1 := \frac{4\kappa_{i+1} |b_4 - \tilde{b}|^2}{3(\tilde{b} - b_0) \times d_{i+1}}.$$

16. The system of claim 10, wherein the processor is configured to determine the interpolant p(t) according to the following:

$$p(t) = \sum_{j=0}^{4} b_j B_j(t),$$

and wherein $$B_j(t) := \binom{4}{j} t^j (1-t)^{(4-j)}.$$

17. The system of claim 10, wherein the processor is configured to identify points $b_0$, $b_1$, $b_2$, $b_3$ and $b_4$ such that the quartic interpolant p(t) is sixth-order accurate over the interval (i≦t≦i+1).

18. The system of claim 10, wherein the processor is configured to configured to determine the quartic interpolant p(t) such that a change in the interpolant p(t) is directly proportional to a change in at least one of the provided positions ($f_i$, $f_{i+1}$), directions ($d_i$, $d_{i+1}$) and curvatures ($\kappa_i$, $\kappa_{i+1}$).

19. A computer program product for modeling at least one section of a curve f, said computer program product comprising:
a computer-readable storage medium having computer-readable program code portions stored therein, the computer-readable program portions comprising:
a first executable portion configured to receive a pair of positions ($f_i$, $f_{i+1}$) of a section of the curve to be modeled, and to additionally receive associated directions ($d_i$, $d_{i+1}$) and curvatures ($\kappa_i$, $\kappa_{i+1}$), of the curve to be modeled, the pair of positions ($f_i$, $f_{i+1}$) and directions ($d_i$, $d_{i+1}$) and curvatures ($\kappa_i$, $\kappa_{i+1}$) being related to a structure being designed;
a second executable portion configured to identify points $b_0$, $b_1$, $b_2$, $b_3$ and $b_4$ based upon the received pair of positions ($f_i$, $f_{i+1}$) and the received directions ($d_i$, $d_{i+1}$) and curvatures ($\kappa_i$, $\kappa_{i+1}$) associated with the pair of positions,
wherein the second executable portion being configured to identify points $b_0$ and $b_4$ includes being configured to setting $b_0$ equal to $f_i$ and $b_4$ equal to $f_{i+1}$,
wherein the second executable portion being configured to identify identifying points $b_1$ and $b_3$ includes being configured to define a control point $\tilde{b}$ based upon the pair of positions ($f_i$, $f_{i+1}$) and directions ($d_i$, $d_{i+1}$), identify point $b_1$ on a segment $\overline{b_0 \tilde{b}}$, and identify point $b_3$ on a segment $\overline{b_4 \tilde{b}}$, where points $b_1$ and $b_3$ are identified further based upon weights ($\rho_0$, $\rho_1$), the weights ($\rho_0$, $\rho_1$) being defined such that:
(a) each weight approaches a value of one-half as a distance between the pair of positions ($f_i$, $f_{i+1}$) approaches zero, and
(b) the weights continuously depend on the positions ($f_i$, $f_{i+1}$), directions ($d_i$, $d_{i+1}$) and curvatures ($\kappa_i$, $\kappa_{i+1}$),
wherein the second executable portion being configured to identify point $b_2$ includes being configured to identify point $b_2$ based upon points $b_1$ and $b_3$ and the curvatures ($\kappa_i$, $\kappa_{i+1}$), and wherein the weights ($\rho_0$, $\rho_1$) are defined, and the points $b_1$ and $b_3$ identified, further such that:
(c) point $b_2$ is disposed within a region bounded by a triangular shape defined by points $\tilde{b}$, $b_1$ and $b_3$; and a third executable portion for determining a quartic interpolant p(t) over an interval ($i \leq t \leq i+1$) based upon points $b_0$, $b_1$, $b_2$, $b_3$ and $b_4$ to thereby model the section of the curve and facilitate design of the structure, wherein the interpolant p(t) has a position, direction and curvature equal to $f_i$, $d_i$ and $\kappa_i$, respectively, at t=i, and wherein the interpolant p(t) has a position, direction and curvature equal to $f_{i+1}$, $d_{i+1}$ and $\kappa_{i+1}$, respectively, at t=i+1, wherein the third executable portion is configured to output the model of the section of the curve for display.

20. The computer program product of claim 19, wherein the second executable portion defines the control point $\tilde{b}$ as a point at the intersection of a line through point $f_0$ parallel to direction $d_0$, and a line through point $f_1$ and parallel to direction $d_1$.

21. The computer program product of claim 20, wherein the second executable portion defines the control point according to the following:

$$\tilde{b} := \frac{(f_1 \times d_1)d_0 + (d_0 \times f_0)d_1}{d_0 \times d_1}.$$

22. The computer program product of claim 19, wherein the second executable portion identifies points $b_1$ and $b_3$ by:
defining weights ($\rho_0$, $\rho_1$) such that $0 < \rho_0, \rho_1 \leq 1$; and
identifying a point $b_1$ and a point $b_3$ according to the following:

$b_1 = (1-\rho_0)b_0 + \rho_0 \tilde{b}$ and $b_3 = (1-\rho_1)b_4 + \rho_1 \tilde{b}$.

23. The computer program product of claim 19, wherein the second executable portion identifies point $b_2$ by:
defining weights ($\alpha_0$, $\alpha_1$) based upon the curvatures ($\kappa_i$, $\kappa_{i+1}$), wherein the weights ($\alpha_0$, $\alpha_1$) are defined such that $\alpha_0, \alpha_1 \geq 0$ and $\alpha_0 + \alpha_1 \leq 1$; and
identifying point $b_2$ according to the following:

$b_2 = \alpha_0 b_1 + \alpha_1 b_3 + (1 - \alpha_0 - \alpha_1)\tilde{b}$.

24. The computer program product of claim 23, wherein the second executable portion defines weights ($\alpha_0$, $\alpha_1$) by:
defining weights ($\rho_0$, $\rho_1$), wherein the weights ($\rho_0$, $\rho_1$) are identified such tat $0 < \rho_0, \rho_1 \leq 1$; and
defining weights ($\alpha_0$, $\alpha_1$) according to the following:

$$\alpha_0 = \frac{R_1 \rho_1^2}{1 - \rho_0} \text{ and } \alpha_1 = \frac{R_0 \rho_0^2}{1 - \rho_1},$$

wherein $$R_0 := \frac{4\kappa_i |\tilde{b} - b_0|^2}{3d_i \times (b_4 - \tilde{b})} \text{ and } R_1 := \frac{4\kappa_{i+1}|b_4 - \tilde{b}|^2}{3(\tilde{b} - b_0) \times d_{i+1}}.$$

25. The computer program product of claim 19, wherein the third executable portion determines the interpolant p(t) according to the following:

$$p(t) = \sum_{j=0}^{4} b_j B_j(t),$$

and wherein $$B_j(t) := \binom{4}{j} t^j (1-t)^{(4-j)}.$$

26. The computer program product of claim 19, wherein the second executable portion identifies points $b_0$, $b_1$, $b_2$, $b_3$ and $b_4$ such that the quartic interpolant p(t) is sixth-order accurate over the interval ($i \leq t \leq i+1$).

27. The computer program product of claim 19, wherein the third executable portion determines the quartic interpolant p(t) such that a change in the interpolant p(t) is directly proportional to a change at least one of the provided positions ($f_i$, $f_{i+1}$), directions ($d_i$, $d_{i+1}$) and curvatures ($\kappa_i$, $\kappa_{i+1}$).

28. A method of modeling at least one section of a curve f, wherein modeling a section comprises:
providing a pair of positions ($f_i$, $f_{i+1}$) of the section of the curve, and additionally providing associated directions ($d_i$, $d_{i+1}$) and associated curvatures ($\kappa_i$, $\kappa_{i+1}$), of the section of the curve, the pair of positions ($f_i$, $f_{i+1}$) and directions ($d_i$, $d_{i+1}$) and curvatures ($\kappa_i$, $\kappa_{i+1}$) being related to a structure being designed;
identifying points $b_0$, $b_1$, $b_2$, $b_3$ and $b_4$ based upon the provided pair of positions ($f_i$, $f_{i+1}$) and associated the provided directions ($d_i$, $d_{i+1}$) and curvatures ($\kappa_i$, $\kappa_{i+1}$) associated with the pair of positions;
determining a quartic interpolant p(t) over an interval ($i \leq t \leq i+1$) based upon points $b_0$, $b_1$, $b_2$, $b_3$ and $b_4$ to thereby model the section of the curve and facilitate design of the structure, wherein the interpolant p(t) has a position, direction and curvature equal to $f_i$, $d_i$, and $\kappa_i$, respectively, at t=i, and wherein the interpolant p(t) has a position, direction and curvature equal to $f_{i+1}$, $d_{i+1}$ and $\kappa_{i+1}$, respectively, at t=i+1, wherein at least one of the positions, directions or curvatures is capable of being provided such that $(2(d_i \times (f_{i+1} - f_i))(d_i \times d_{i+1})^2 - 3\kappa_i((f_{i+1} - f_i) \times d_{i+1})^2) \cdot (2((f_{i+1} - f_i) \times d_{i+1})(d_i \times d_{i+1})^2 - 3\kappa_{i+1}(d_i \times (f_{i+1} - f_i))^2) > 0$; and displaying the model of the section of the curve.

29. A system for modeling at least one section of a curve f comprising:
a processor configured to receive a pair of positions ($f_i$, $f_{i+1}$) of a section of the curve to be modeled, and additionally receive associated directions ($d_i$, $d_{i+1}$) and associated curvatures ($\kappa_i$, $\kappa_{i+1}$), of a section of the curve to be modeled, the pair of positions ($f_i$, $f_{i+1}$) and directions ($d_i$, $d_{i+1}$) and curvatures ($\kappa_i$, $\kappa_{i+1}$) being related to a structure being designed, wherein for each section the processor is configured to identify points $b_0$, $b_1$, $b_2$, $b_3$ and $b_4$ based upon the received pair of positions ($f_i$, $f_{i+1}$) and associated received directions ($d_i$, $d_{i+1}$) and curvatures ($\kappa_i$, $\kappa_{i+1}$) associated with the pair of positions, wherein the processor is also configured to determine a quartic interpolant p(t) over an interval ($i \leq t \leq i+1$) based upon points $b_0$, $b_1$, $b_2$, $b_3$ and $b_4$ to thereby model the respective section of the curve and facilitate design of the structure, wherein the interpolant p(t) has a position, direction and curvature equal to $f_i$, $d_i$, and $\kappa_i$, respectively, at t=i, and wherein the interpolant p(t) has a position, direction and curvature equal to $f_{i+1}$, $d_{i+1}$ and $\kappa_{i+1}$, respectively, at t=i+1, wherein at least one of the positions, directions or associated curvatures is capable of being provided such that $$(2(d_i \times (f_{i+1}-f_i))(d_i \times d_{i+1})^2 - 3\kappa_i((f_{i+1}-f_i) \times d_{i+1})^2) \cdot (2((f_{i+1}-f_i) \times d_{i+1})(d_i \times d_{i+1})^2 - 3\kappa_{i+1}(d_i \times (f_{i+1}-f_i))^2) > 0, \text{ and}$$

wherein the processor is configured to output the model of the section of the curve for display.

30. A computer program product for modeling at least one section of a curve f, said computer program product comprising a computer-readable storage medium having computer-readable program code portions stored therein, the computer-readable program portions comprising:

a first executable portion configured to receive a pair of positions ($f_i$, $f_{i+1}$) of a section of the curve to be modeled, and for additionally receive associated directions ($d_i$, $d_{i+1}$) and associated curvatures ($\kappa_i$, $\kappa_{i+1}$), of the curve to be modeled, the pair of positions ($f_i$, $f_{i+1}$) and directions ($d_i$, $d_{i+1}$) and curvatures ($\kappa_i$, $\kappa_{i+1}$) being related to a structure being designed;

a second executable portion configured to identify points $b_0$, $b_1$, $b_2$, $b_3$ and $b_4$ based upon the received pair of positions ($f_i$, $f_{i+1}$) and associated the received directions ($d_i$, $d_{i+1}$) and curvatures ($\kappa_i$, $\kappa_{i+1}$) associated with the pair of positions; and a third executable portion configured to determine a quartic interpolant p(t) over an interval (i≦t≦i+1) based upon points $b_0$, $b_1$, $b_2$, $b_3$ and $b_4$ to thereby model the section of the curve and facilitate design of the structure, wherein the interpolant p(t) has a position, direction and curvature equal to $f_i$, $d_i$ and $\kappa_i$, respectively, at t=i, and wherein the interpolant p(t) has a position, direction and curvature equal to $f_{i+1}$, $d_{i+1}$ and $\kappa_{i+1}$, respectively, at t=i+1, wherein at least one of the positions, directions and associated curvatures is capable of being provided such that $$(2(d_i \times (f_{i+1}-f_i))(d_i \times d_{i+1})^2 - 3\kappa_i((f_{i+1}-f_i) \times d_{i+1})^2) \cdot (2((f_{i+1}-f_i) \times d_{i+1})(d_i \times d_{i+1})^2 - 3\kappa_{i+1}(d_i \times (f_{i+1}-f_i))^2) > 0, \text{ and}$$

wherein the third executable portion is configured to output the model of the section of the curve for display.

* * * * *